United States Patent
Komaba et al.

(10) Patent No.: US 10,491,779 B2
(45) Date of Patent: Nov. 26, 2019

(54) IMAGE PROCESSING APPARATUS, ERROR RECOVERY IMAGE DISPLAY METHOD FOR THE SAME, AND RECORDING MEDIUM

(71) Applicant: Konica Minolta, Inc., Chiyoda-ku, Tokyo (JP)

(72) Inventors: Kenichi Komaba, Toyokawa (JP); Shinichi Asai, Gamagori (JP); Yu Sonoda, Toyokawa (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/640,817

(22) Filed: Jul. 3, 2017

(65) Prior Publication Data

US 2018/0007227 A1    Jan. 4, 2018

(30) Foreign Application Priority Data

Jul. 4, 2016  (JP) ................................. 2016-132580

(51) Int. Cl.
| | | |
|---|---|---|
| H04N 1/32 | (2006.01) | |
| H04N 1/00 | (2006.01) | |
| G06F 3/12 | (2006.01) | |
| H04N 1/21 | (2006.01) | |

(52) U.S. Cl.
CPC ......... *H04N 1/32657* (2013.01); *G06F 3/121* (2013.01); *H04N 1/00419* (2013.01); *H04N 1/00503* (2013.01); *H04N 1/2129* (2013.01); *H04N 1/3263* (2013.01); *H04N 2201/0094* (2013.01); *H04N 2201/3267* (2013.01); *H04N 2201/3284* (2013.01)

(58) Field of Classification Search
CPC .... G06F 3/121; G06F 3/1234; G06F 11/0748; G06F 11/0733; H04N 1/0002; H04N 1/32625; H04N 1/32635; H04N 1/32609; H04N 1/32662; H04N 2201/0081; H04N 2201/0082; H04N 2201/0091; H04N 2201/0094
USPC .............. 358/1.11–1.18, 504, 406; 399/8–31
See application file for complete search history.

(56) References Cited

U.S. PATENT DOCUMENTS 5,877,961 A * 3/1999 Moore ............... G01R 31/2834
   700/110
6,750,878 B1 * 6/2004 Tatsuo ...................... B41J 3/46
   399/81

(Continued)

FOREIGN PATENT DOCUMENTS

| JP | 2005-208335 | 8/2005 |
|---|---|---|
| JP | 2006-317919 | 11/2006 |
| JP | 2009-145689 | 7/2009 |

*Primary Examiner* — Chad Dickerson
(74) *Attorney, Agent, or Firm* — Baker Hostetler

(57) ABSTRACT

An image processing apparatus includes: a display; a memory that stores multiple key frames of a video guide on how to recover from an operating error; an error sensor that detects the operating error; and a display processor that allows the display to display at least one of the multiple key frames as a still frame for a digest along with an operation button for video playback, when the error sensor detects the operating error, the multiple key frames being stored on the memory, and that further allows the display to play back the video guide by serially displaying the multiple key frames, when the operation button is pressed.

21 Claims, 17 Drawing Sheets

(56) References Cited

U.S. PATENT DOCUMENTS

| | | | | |
|---|---|---|---|---|
| 2004/0034698 A1* | 2/2004 | Abu-Husein | ....... | G06F 11/0748 709/223 |
| 2007/0201050 A1* | 8/2007 | Mochizuki | ......... | H04N 1/00408 358/1.1 |
| 2007/0237537 A1* | 10/2007 | Hasegawa | .............. | G03G 15/55 399/81 |

* cited by examiner

IMAGE PROCESSING APPARATUS, ERROR RECOVERY IMAGE DISPLAY METHOD FOR THE SAME, AND RECORDING MEDIUM

This application claims priority under 35 U.S.C. § 119 to Japanese Patent Application No. 2016-132580 filed on Jul. 4, 2016, the entire disclosure of which is incorporated herein by reference.

BACKGROUND

Technological Field

The present invention relates to an image processing apparatus such as a multi-function peripheral (MFP), i.e., a multifunctional digital image forming apparatus; an error recovery image display method for the image processing apparatus; and a recording medium.

Description of the Related Art

As is known, image forming apparatuses such as MFPs are configured to detect various operating errors while executing a job, for example. Such an MFP is provided with, for example: a document conveying device that feeds and conveys documents; and a paper conveying mechanism that feeds and conveys sheets of paper for image forming. According to a publicly-known technique, the MFP is configured to display a video guide on how to recover from operating errors on the display of its operation panel when there is a trouble in conveyance control (such as a paper jam or wrong paper size). The MFP is further configured to display a frame advance key for advancing the video guide frame by frame, a pause key for pausing the video guide, and a zoom-in key for zooming in on a part of a still frame of the video guide, such that the user can operate the MFP using these keys (for example, Japanese Unexamined Patent Application Publication No. 2005-208335).

This technique facilitates the user searching the video guide for a target part. Specifically, when a paper jam occurs, the user can find relevant parts easily by advancing the video guide frame by frame, pausing the video guide, and zooming in on a lever, for example, that is shown in a still frame in the video guide where he/she paused.

If the user has some experiences of resolving a paper jam, he/she must already know which door cover to open to remove jammed paper; otherwise, all door covers may be loaded in very easy places to find. In either case, the user would feel impatient about finding relevant parts from the video guide and thus would not be able to complete resolving the paper jam as smoothly as expected, which is troublesome.

As a solution to the problem, the MFP can be configured to display only an approximate location of a paper jam when it occurs. In this case, the user might not remember how to resolve a paper jam and thus need to watch the video guide reluctantly. This is also troublesome because the user might have to watch the entire video guide including irrelevant parts and thus feel impatient about finding relevant parts.

The MFP also can be configured to display a screen with instructions on how to recover from a paper jam as well as an approximate location of the paper jam. However, the MFP would require a lot of labor for design since there are many possible locations for a paper jam.

The image processing apparatuses have the same problems as described above, not only with a paper jam, but with all operating errors they can detect.

SUMMARY

The present invention, which has been made on the basis of a technical background as described above, provides an image processing apparatus, an error recovery image display method for the same, and a recording medium; the image processing apparatus, the error recovery image display method, and the recording medium will no longer bother a user who has sufficient experience of resolving an operating error by playing back a video guide on how to resolve it but will allow a user who has little or no experience of resolving an operating error to resolve it quite smoothly by playing back a video guide on how to resolve it.

To achieve at least one of the abovementioned objects, a first aspect of the present invention relates to an image processing apparatus including:

a display;

a memory that stores multiple key frames of a video guide on how to recover from an operating error;

an error sensor that detects the operating error; and a display processor that allows the display to display at least one of the multiple key frames as a still frame for a digest along with an operation button for video playback, when the error sensor detects the operating error, the multiple key frames being stored on the memory, and that further allows the display to play back the video guide by serially displaying the multiple key frames, when the operation button is pressed.

To achieve at least one of the abovementioned objects, a second aspect of the present invention relates to an error recovery image display method to be implemented by an image processing apparatus, the image processing apparatus including:

a display; and a memory that stores multiple key frames of a video guide on how to recover from an operating error, the error recovery image display method including:

detecting an operating error; and allowing the display to display at least one of the multiple key frames as a still frame for a digest along with an operation button for video playback, when the operating error is detected, the multiple key frames being stored on the memory, and further allowing the display to play back the video guide by serially displaying the multiple key frames, when the operation button is pressed.

To achieve at least one of the abovementioned objects, a third aspect of the present invention relates to a non-transitory computer-readable recording medium storing a program for displaying an error recovery image, the program to be run by a computer of an image processing apparatus including:

a display; and a memory that stores multiple key frames of a video guide on how to recover from an operating error, the program to make the computer execute:

detecting an operating error; and allowing the display to display at least one of the multiple key frames as a still frame for a digest along with an operation button for video playback, when the operating error is detected, the multiple key frames being stored on the memory, and further allowing the display to play back the video guide by serially displaying the multiple key frames, when the operation button is pressed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
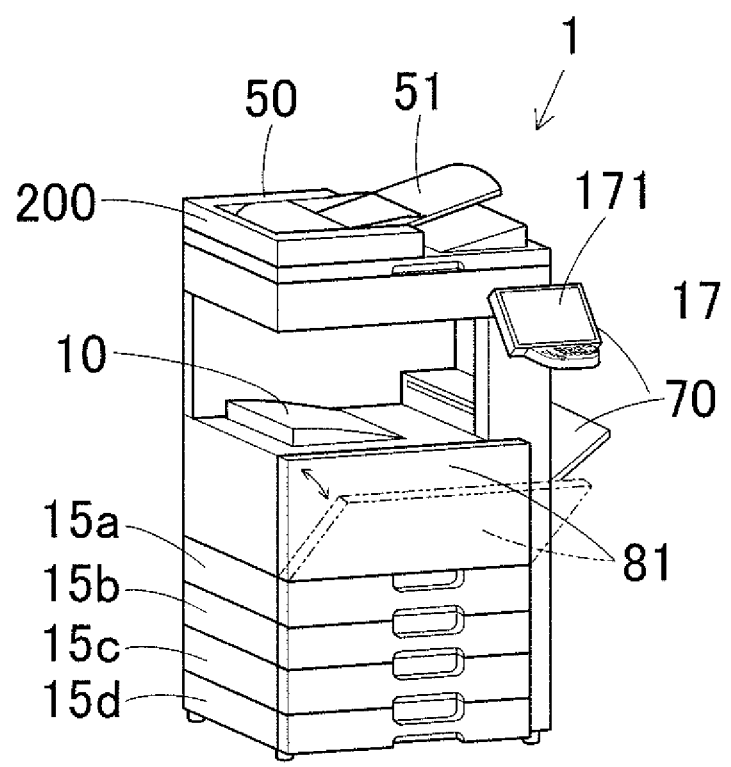
FIG. 1 is a perspective view illustrating the exterior of an image processing apparatus according to one embodiment of the present invention.

Hereinafter, one or more embodiments of the present invention will be described with reference to the drawings. However, the scope of the invention is not limited to the disclosed embodiments FIG. 1 is a perspective view illustrating the exterior of an image processing apparatus 1 according to one embodiment of the present invention. In this embodiment, an MFP, i.e., a multifunctional digital image forming apparatus as described above is used as an image processing apparatus 1. Hereinafter, the image processing apparatus 1 will also be referred to as MFP 1.

The MFP 1 is provided with a document conveying device (ADF) 50 on its top; the document conveying device 50 automatically feeds a document set on a document tray 51 and conveys it to a scanning position. The MFP 1 is further provided with: an operation panel 17 in the upper-right part of its front; paper feed cassettes 15a to 15d in its lower part; and a manual-bypass tray 70 on its side.

Moreover, the MFP 1 is provided with a front door cover 81 in the middle part of its front. The front door cover 81 is hinged at its bottom such that the user can pull and push the front door cover 81 to open and close it. The user can use the front door cover 81, for example, to replace a toner cartridge; however, when the user opens the front door cover 81 while paper is being conveyed for a print job, the MFP 1 detects an operating error by its sensor and stops the current job and paper conveyance. Although not shown in this figure, the MFP 1 is further provided with one or more side door covers on the side where the manual-bypass tray 70 is positioned: the user can use the one or more side door covers to remove jammed paper. When the user opens any of these side door covers while paper is being conveyed for a print job, the MFP 1 stops the current job and paper conveyance as is the case with the front door cover 81.

Although not shown in this figure, the MFP 1 may be provided with a finisher that executes finishing options after printing paper. When the user opens a door cover for this finisher while paper is being conveyed for a print job, the MFP 1 detects an operating error by its sensor and stops the current job and paper conveyance as is the case with the front door cover 81 and the other door covers.

Figure 2:
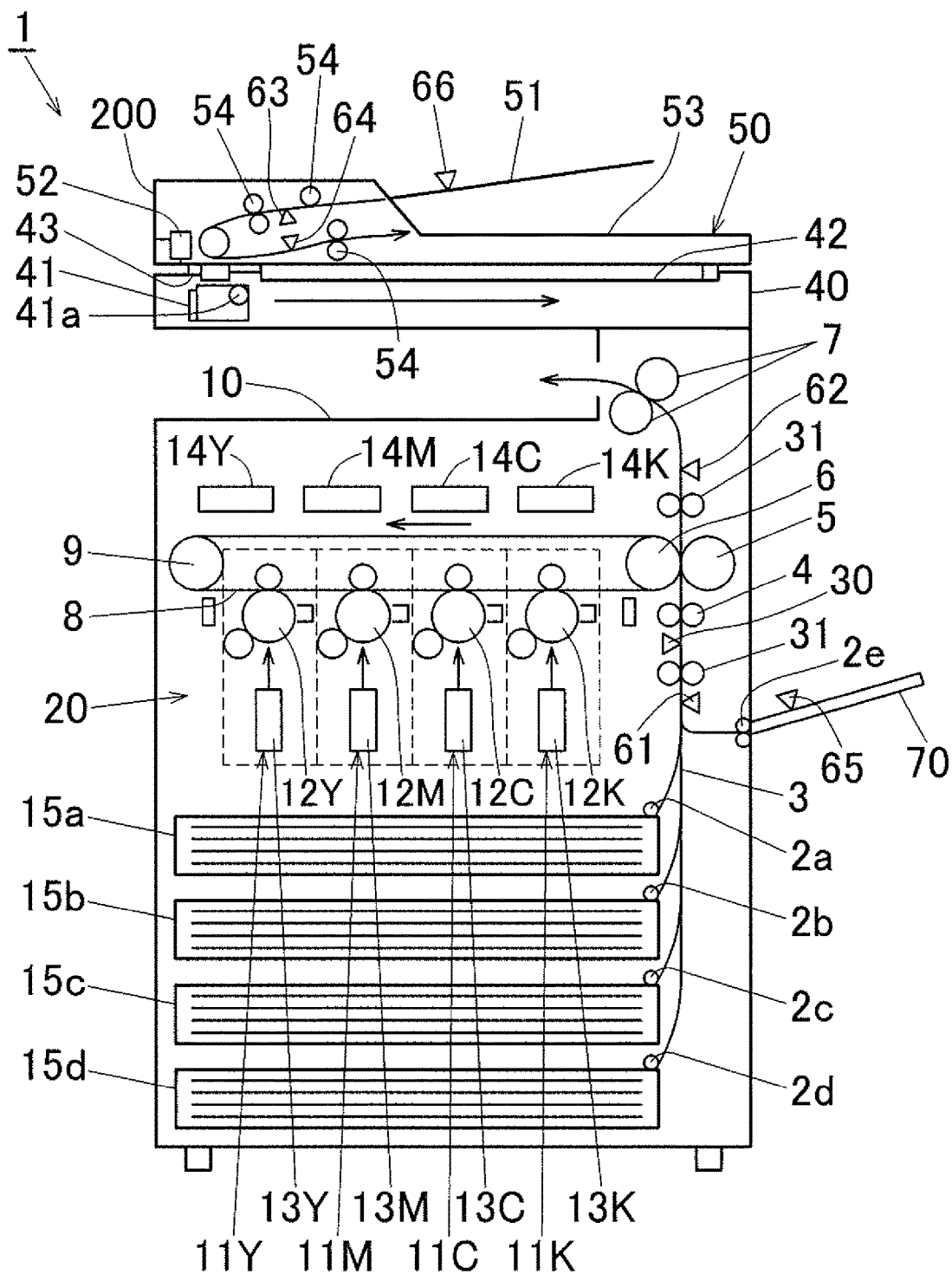
FIG. 2 illustrates a comprehensive configuration of the interior of the image processing apparatus.

FIG. 2 illustrates a comprehensive configuration of the interior of the MFP 1. The MFP 1 is provided with a printer (engine) 20, a scanner 40, and the aforementioned document conveying device 50, the configurations of which are already well known. So, the printer 20, the scanner 40, and the document conveying device 50 will be only briefly described below along with their operations.

When the printer 20 receives instructions for starting printing from an image controller (not shown in this figure), paper feed rollers 2a to 2e feed paper from the paper feed cassettes 15a to 15d or from the manual-bypass tray 70, and multiple pairs of conveyance rollers 31, which are disposed at predetermined positions, convey the paper along a conveyance path 3. The pairs of conveyance rollers 31 put the paper on hold at a position of the conveyance path 3 where a timing sensor 30 detects the paper. One or more sensors 65 that judge whether or not paper is set in a correct position are disposed on the manual-bypass tray 70. Moreover, multiple other sensors that detect the passing of paper and a paper jam, such as sensors 61 and 62, are disposed at predetermined positions along the conveyance path 3. Although not shown in this figure, the MFP 1 is provided with other sensors that detect the opening and closing of the door cover 80 on its front and the same of the side door covers on its side.

With the rotation of a transfer belt driving roller 9, a transfer belt 8 circulates about the transfer belt driving roller 9 and a driven roller 6.

Along the outer and lower surface of the transfer belt 8, four image forming process units (imaging units) 11Y, 11M, 11C, and 11K are disposed in parallel for yellow (Y), magenta (M), Cyan (C), and black (K) colors, respectively. While the transfer belt 8 circulates, the image forming process units 11Y, 11M, 11C, and 11K form YMCK toner images on the transfer belt 8. As is shown, also provided are exposure devices 13Y, 13M, 13C, and 13K that expose photosensitive drums 12Y, 12M, 12C, and 12K to light, respectively.

Disposed adjacent to the process units 11Y, 11M, 11C, and 11K, respectively, are toner cartridges 14Y, 14M, 14C, and 14K containing YMCK toners.

Being circulated, the transfer belt 8 conveys the toner images layered on the transfer belt 8 itself. Upon the reach of the toner images to a second transfer roller 5, the timing roller 4 is started to convey paper such that the upper end of the paper is adjusted to the same of the toner images on the transfer belt 8.

While the paper is passing through the driven roller 6 and the second transfer roller 5, voltage is applied to the second transfer roller 5, and thereby the toner images on the transfer belt 8 are transferred onto the paper. After being transferred onto the paper, the toner images are further fused on the paper by a fuser roller 7. The paper with the fused toner images is output onto a paper output tray 10.

The scanner 40 includes a scan unit 41 which is provided with a CCD (not shown in this figure) and an exposure lamp 41a both for reading a document image. The scanner 40 reads a document image by scanning a document that is put on a platen glass 42 serving as a document table.

Disposed on the scanner 40 is the document conveying device 50 that automatically feeds and conveys a document. The document conveying device 50 feeds one or more pages of a document loaded on a document tray 51 one after another and conveys them to a scanning position 43 of the scanner 40 via a conveyance roller 54. Moreover, the document conveying device 50 scans a page of the document while conveying it, then outputs it onto a document output tray 53.

The document conveying device 50 is hinged at its farthest end from the user such that the user can open and close the document conveying device 50 by lifting it up and down. The user can lift up the document conveying device 50 to uncover the platen glass 42 and put a document on the platen glass 42; the user can also lift down the document conveying device 50 to cover the platen glass 42. That is, the document conveying device 50 also functions as a document cover 200 that can cover and uncover the platen glass 42 that serves as a document table. The opening and closing of the document cover 200 is detected by a sensor not shown in this figure.

One or more sensors 66 that judge whether or not a document is set in a correct position are disposed on the document tray 51. Moreover, one or more other sensors that detect the passing of a document and a paper jam, such as sensors 63 and 64, are disposed along a document conveyance path.

The scanner 40 transfers image data, which is obtained by scanning a document, to the image controller not shown in this figure, and the image controller performs image processing on the image data. Assuming that the user gave instructions for copying via the operation panel 17, the scanner 40 will transfer the image data, which has been subjected to image processing, to the printer 20. Assuming that the user gave instructions for scanning, the scanner 40 will convert the image data into an image format and output the image formatted data.

Figure 3:
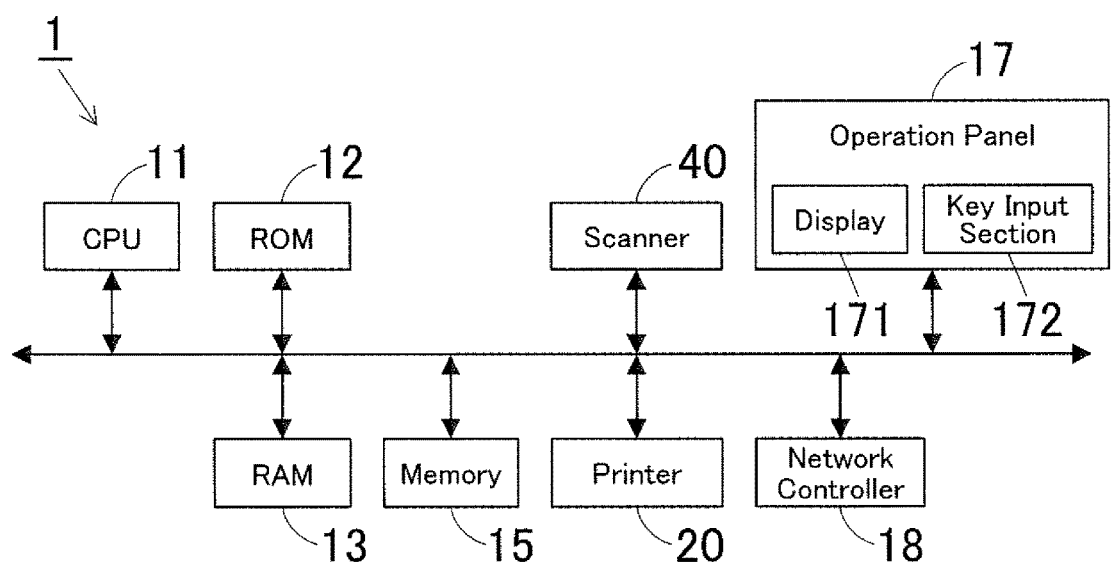
FIG. 3 is a block diagram illustrating an electrical configuration of the image processing apparatus.

FIG. 3 is a block diagram illustrating an electrical configuration of the MFP 1.

In addition to the printer 20 and the scanner 40 as described above, the MFP 1 is essentially provided with: a CPU 11; a ROM 12; a RAM 13; a memory 15; an operation panel 17; and a network controller (also referred to as "NIC") 18.

The CPU 11 controls the MFP 1 in a unified and systematic manner such that users can use the basic functions of the MFP 1 such as a copier function, a printer function, a scanner function, and a facsimile function. Furthermore, the CPU 11 detects an operating error such as a paper jam, the recovery from such an operating error, and the user operation for resolving such an operating error, by the sensors. Upon detecting an operating error, the CPU 11 stops the current job and displays a notice of the occurrence of the operating error and a video guide on how to recover from operating errors on a display 171 of the operation panel 17. Instead of the video guide, the CPU 11 may display some key frames on the display 171, as still frames for a digest. These operations will be later described in details.

The ROM 12 is a memory that essentially stores operation programs for the CPU 11.

The RAM 13 is a memory that provides a work area for the CPU 11 to perform processing in accordance with an operation program.

The scanner 40 is, as described above, a reading means that reads a document image by scanning a document that is put on the document conveying device 50 or the platen glass 42 and that outputs an image formatted file.

The memory 15 is comprised of a non-volatile memory device such as a hard disk drive (HDD). The memory 15 stores information to be displayed on the display 171 about every operating error, and also stores a job history, document images obtained by the scanner 14, print data received from user terminals, and other information. In this embodiment, as the information to be displayed on the display 171, the memory 15 stores multiple key frames of a video guide on how to recover from an operating error while each of the multiple key frames is associated with a step of instructions on how to recover from an operating error. With reference to the association, the MFP 1 is allowed to use at least one of the multiple key frames in updating the still frame for a digest.

The printer 20 prints a document image obtained by the scanner 40, print data received from user terminals, and other data, in a specified print mode.

The operation panel 17 serves for various input operations and is provided with a display 171 and a key input section 172. The display 171 is comprised of, for example, a touch panel liquid-crystal display that displays messages and operation screens; the key input section 172 is provided with a numeric keypad, a start key, a stop key, and other keys.

The network controller 18 maintains data transmission and receipt by controlling communication with other image forming apparatuses and external apparatuses such as user terminals on the network.

Hereinafter, the operation to be performed by the MFP 1 when an operating error occurs on the MFP 1 will be described.

In this embodiment, upon detecting an operating error, the MFP 1 stops the current job and displays a notice of the occurrence of the operating error and an operation guide on how to recover from the operating error, on the display 171.

Figure 4:
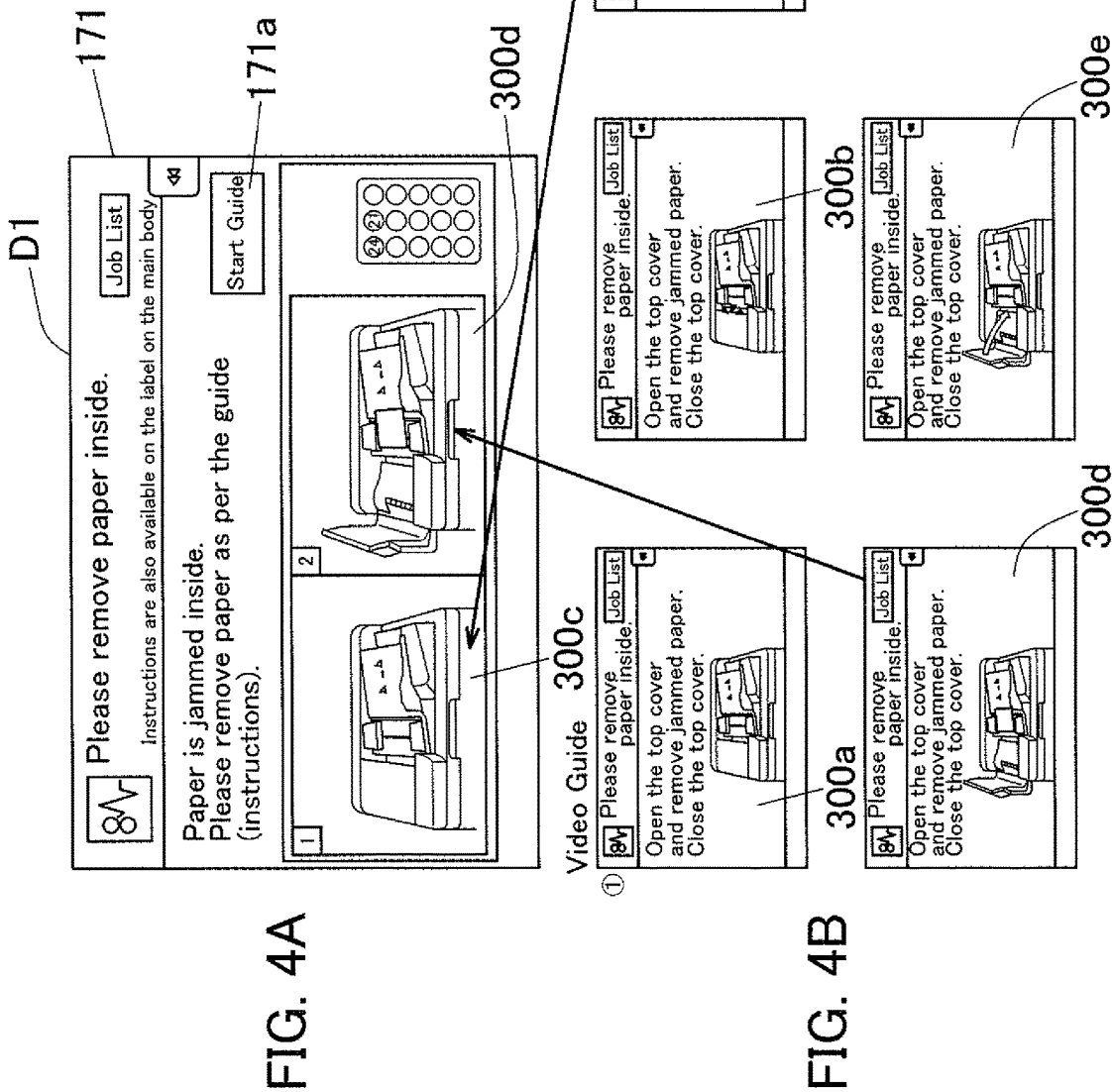
FIGS. 4A and 4B are views for reference in describing the operation to be performed by the image processing apparatus when an operating error occurs.

Assuming that the operating error is caused by a paper jam on the document conveying device 50, the MFP 1 displays a screen D1 as illustrated in FIG. 4A; the screen D1 shows messages that notify of the occurrence of a paper jam and instruct the user to remove jammed paper as per a video guide, on the display 171, along with a guide start button 171a. In this embodiment, the MFP 1 further displays one or more key frames (two frames, in this embodiment) such as key frames 300c and 300d of a video guide on how to recover from a paper jam on the document conveying device 50, as still frames for a digest. These frames 300c and 300d are selected from key frames 300a to 300i of a video guide on how to recover from a paper jam on the document conveying device 50 as illustrated in FIG. 4B, because the key frames 300c and 300d satisfy a specific condition. The specific condition will be later described in details.

When the user presses the guide start button 171a, the MFP 1 plays back a video guide on how to recover from a paper jam. The user may have sufficient experience of resolving a paper jam; in this case, he/she does not need to press the guide start button 171a for video playback and only need to see the key frames 300c and 300d to remember how to resolve a paper jam. As a result, the user who already knows how to resolve a paper jam does not have to see the video guide that is automatically played back, and thus can resolve the paper jam quite smoothly. Meanwhile, the user may have little or no experience of resolving a paper jam; in this case, he/she needs to press the guide start button 171a for video playback. The MFP 1 plays back the video guide by serially displaying the key frames 300a to 300e. With this video guide, the user can learn how to resolve a paper jam without any problem. Therefore, any user can resolve a paper jam quite smoothly regardless of whether or not he/she has sufficient experience thereof.

Figure 5:
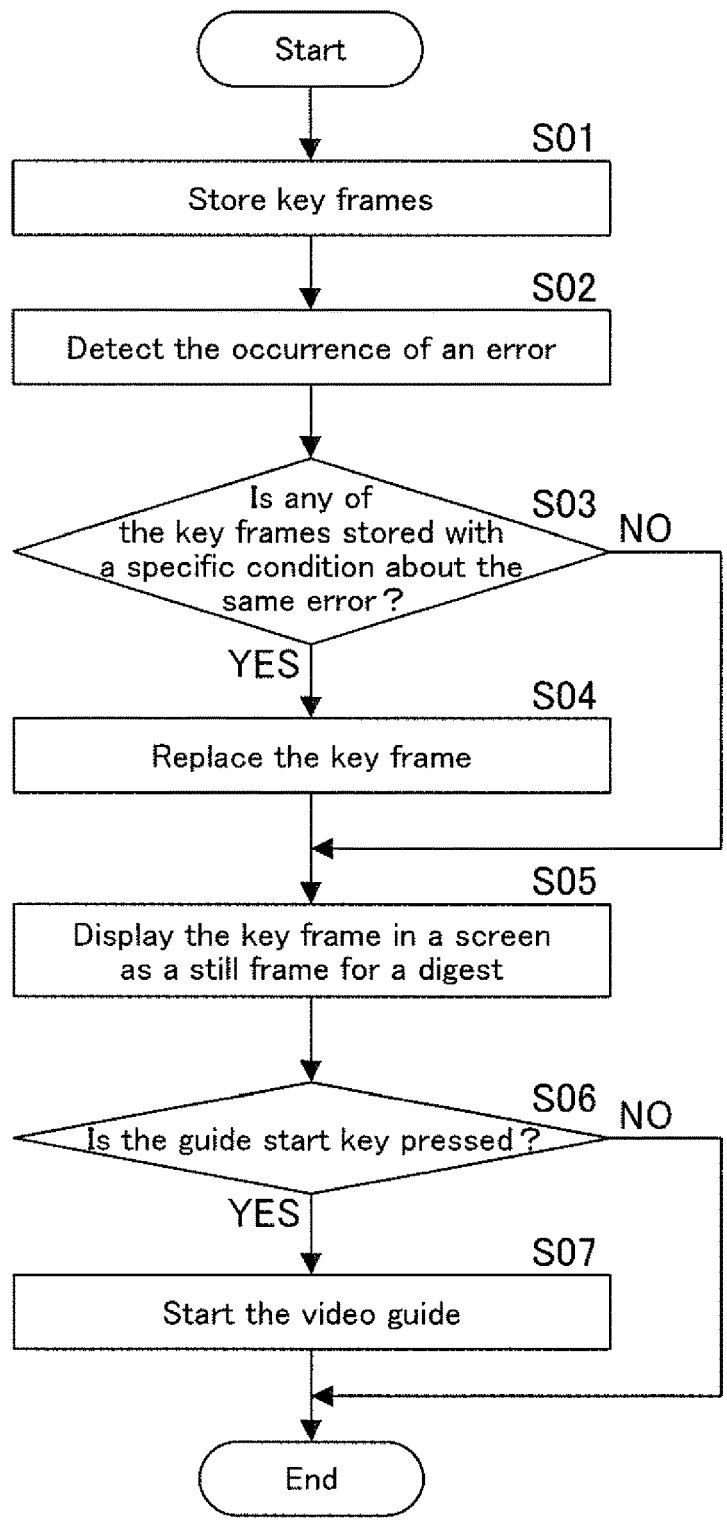
FIG. 5 is a flowchart representing the basic processing to be executed by the image processing apparatus when an operating error occurs and the image processing apparatus detects it.

FIG. 5 is a flowchart representing the basic processing to be executed by the MFP 1 when an operating error occurs and the MFP 1 detects it. The operations represented by the FIG. 5 flowchart and the following flowcharts are executed by the CPU 11 of the MFP 1 in accordance with operation programs stored on a recording medium such as the ROM 12.

In Step S01, the MFP 1 stores default key frames in advance on the memory 15 about every operating error; each of them has been selected by default from multiple key frames of a video guide on how to recover from an operating error.

In Step S02, the MFP 1 detects the occurrence of an operating error. In Step S03, the MFP 1 judges whether or not any of the key frames is stored with a specific condition about the same operating error. If any of them is stored with a specific condition (YES in Step S03), the flowchart proceeds to Step S04, in which the MFP 1 replaces the key frame stored in Step S01 with the key frame stored with the specific condition. The flowchart then proceeds to Step S05. If none of them is stored with a specific condition (NO in Step S03), the flowchart proceeds directly to Step S05.

In Step S05, the MFP 1 displays either the default key frame or the lately replaced key frame as a still frame for a digest, in a display screen with a notice of the occurrence of the operating error. After the judgment that any of the key frames is stored with the specific condition, the MFP 1 displays this key frame; after the judgment that none of the key frames is stored with the specific condition, the MFP 1 displays the default key frame.

In Step S06, the MFP 1 then judges whether or not the guide start key 171a shown in the screen is pressed. If it is pressed (YES in Step S06), the MFP 1 starts the video guide (playback of the video guide) in Step S07. If it is not pressed (NO in Step S06), the MFP 1 does not start the video guide.

As described above, in this embodiment, if any of multiple key frames of the video guide is stored with a specific condition about the same operating error, the MFP 1 displays this key frame as a still frame for a digest. The key frame stored with a specific condition will be later described in details.

Figure 6:
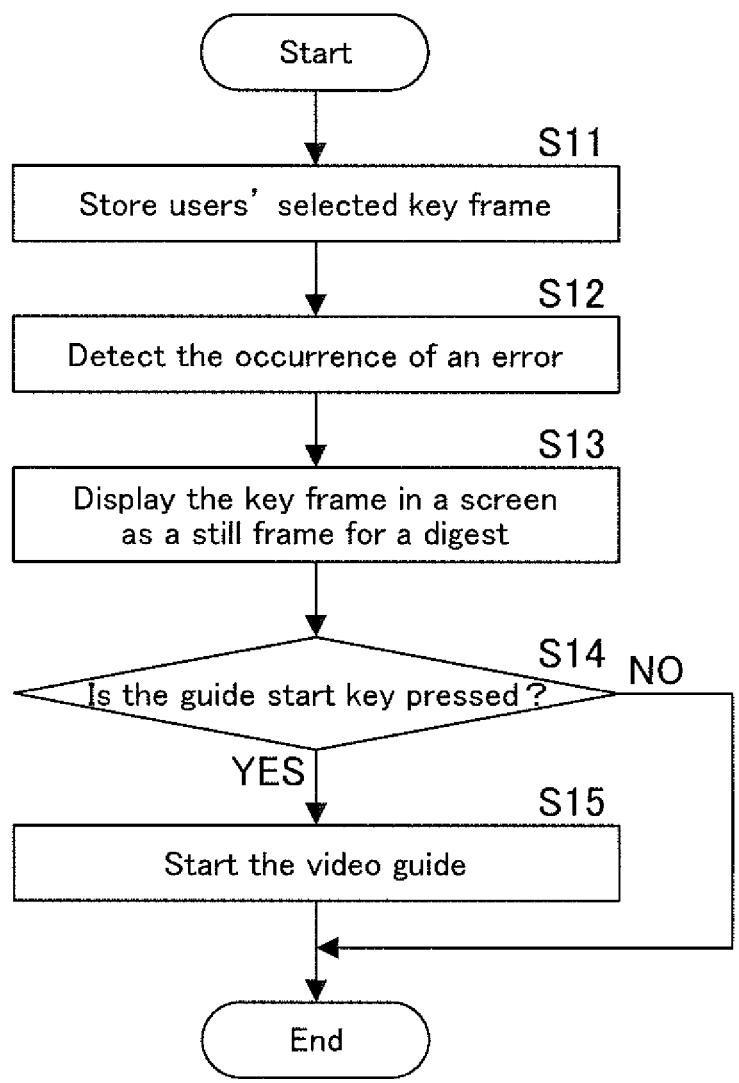
FIG. 6 is a flowchart representing another processing to be executed by the image processing apparatus when an operating error occurs and the image processing apparatus detects it.

FIG. 6 is a flowchart representing another processing to be executed by the MFP 1 when an operating error occurs and the MFP 1 detects it. In this processing, the MFP 1 displays a user's selected key frame as a still frame for a digest. The MFP 1 is configured to display multiple key frames of the video guide upon recovering from an operating error, allowing the user to select a key frame to be displayed as a still frame for a digest the next time the same operating error occurs. The MFP 1 is further configured to display a user's selected key frame as a still frame for a digest upon the reoccurrence of the same operating error; the key frame to be displayed is different depending on the user.

In Step S11, the MFP 1 stores users' selected key frames in advance on the memory 15 about every user and about every operating error; each of them has been selected by a user from multiple key frames of the video guide.

In Step S12, the MFP 1 detects the occurrence of an operating error. In Step S13, the MFP 1 displays the user's selected key frame, which is stored in Step S11, as a still frame for a digest, in a display screen with a notice of the occurrence of the operating error.

In Step S14, the MFP 1 then judges whether or not the guide start key 171a shown in the screen is pressed. If it is pressed (YES in Step S14), the MFP 1 starts the video guide in Step S15. If it is not pressed (NO in Step S14), the MFP 1 does not start the video guide.

As described above, in this embodiment, upon detecting an operating error, the MFP 1 displays a key frame that is selected in advance by the user from multiple key frames of the video guide, as a still frame for a digest. With this key frame, the user can resolve the operating error quite smoothly.

Figure 7:
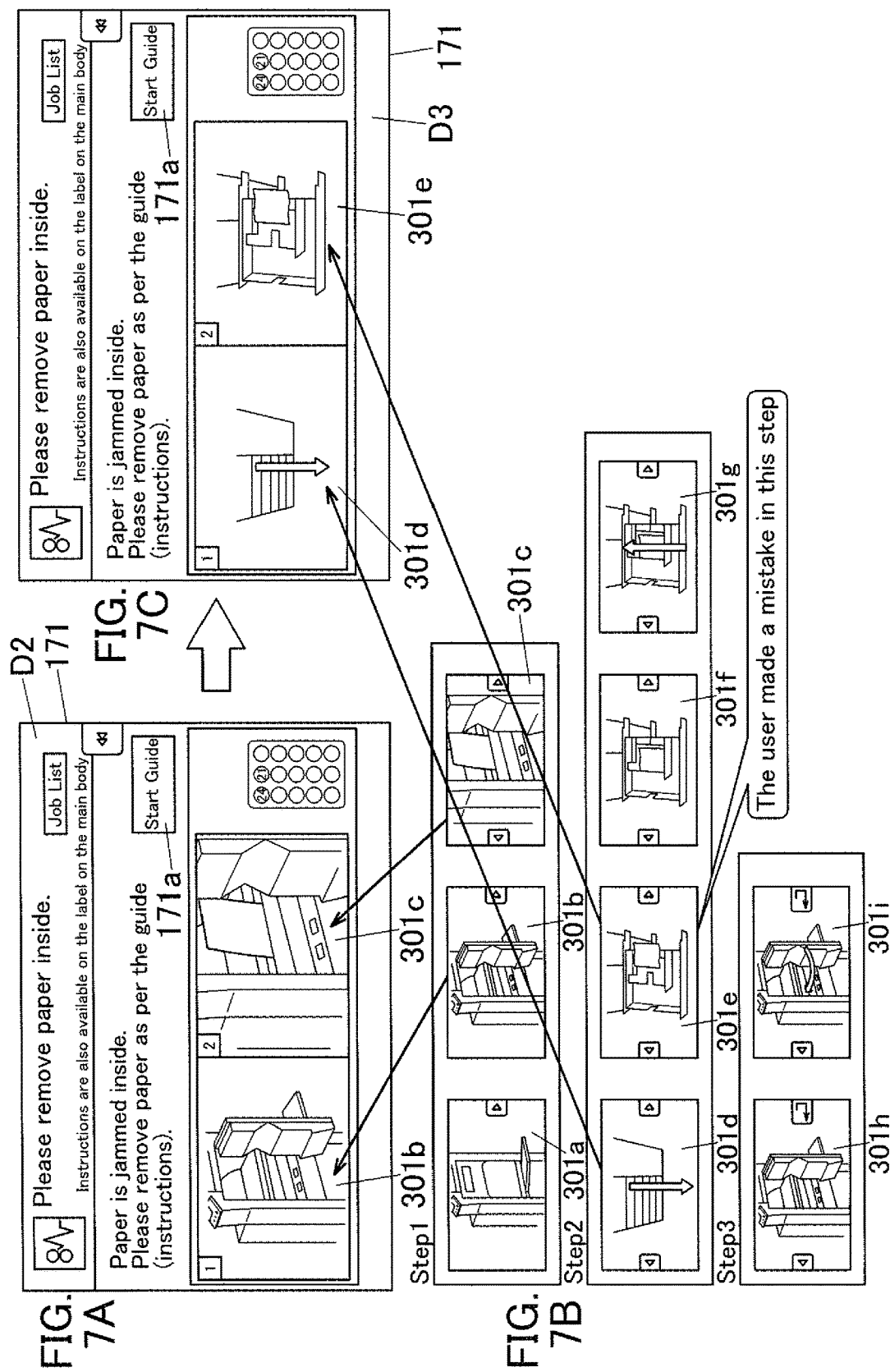
FIGS. 7A, 7B, and 7C are views for reference in describing an example of "a key frame stored with a specific condition" in Step S03 of the FIG. 5 flowchart.

FIGS. 7A to 7C are views for reference in describing an example of "a key frame stored with a specific condition" in Step S03 of the FIG. 5 flowchart. In this embodiment, the MFP 1 is configured to detect user activities, i.e., locations and activity in each location, by its sensor, for example, and to record the user activities during playback of a video guide on how to recover from an operating error such as a paper jam. Since each key frame of the video guide is associated with a step of the instructions, the MFP 1 is allowed to judge whether or not any of the key frames shows the step that was not matched by a user activity. If any of them shows the step that was not matched by a user activity, the MFP 1 stores this key frame on a recording medium such as the memory 15 such that the MFP 1 later can display key frames, including the key frame showing the step that was not matched by a user activity, on the display 171 as still frames for a digest, upon detecting the same operating error.

Hereinafter, a specific example will be described. Upon detecting an operating error, the MFP 1 displays a display screen D2 as illustrated in FIG. 7A; the display screen D2 shows the key frames 301*b* and 301*c* by default, out of the key frames 301*a* to 301*i* of the video guide as illustrated in FIG. 7B, as still frames for a digest. If the key frame 301*e* shows the step that was not matched by a user activity in resolving an operating error (if the user made a mistake), the MFP 1 stores the key frame 301*e* about the operating error.

At a later time, upon detecting the same operating error, the MFP 1 displays a screen D3 as illustrated in FIG. 7C; the screen D3 shows the key frame 301*e* that shows the step that was not matched by a user activity and the key frame 301*d* that shows the step right before the step shown in the key frame 301*e*, as still frames for a digest, in place of the key frames 301*b* and 301*c* that are selected by default.

As described above, if the key frame 301*e*, out of the key frames 301*a* to 301*i*, shows the step that was not matched by a user activity in resolving an operating error, the MFP 1 displays key frames, including the key frame 301*e*, as still frames for a digest. With this key frame, the user can learn the correct activity for the step in which the user made a mistake and can resolve the operating error without any problem.

Figure 8:
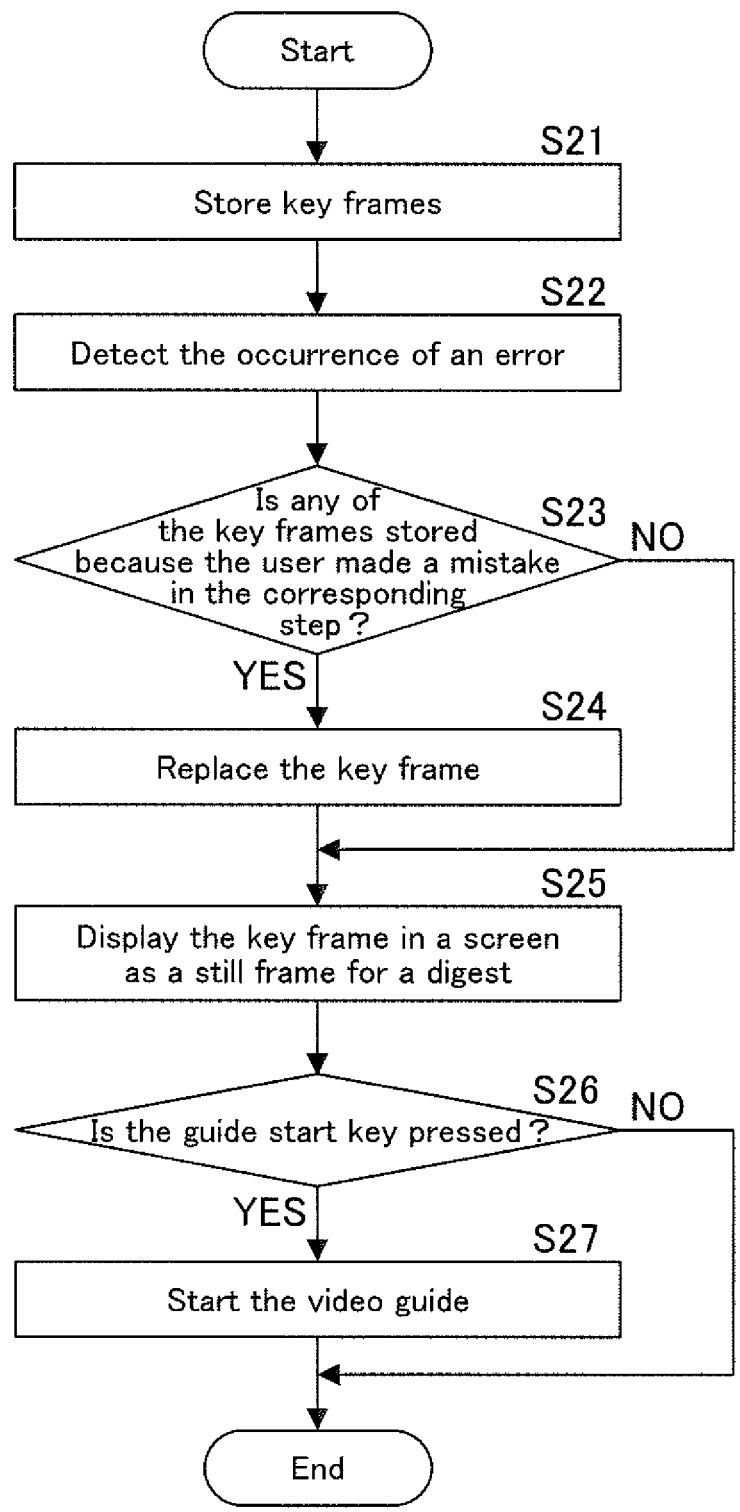
FIG. 8 is a flowchart representing the operation to be performed by the image processing apparatus when the image processing apparatus detects an operating error, in the case of FIGS. 7A to 7C where any of the key frames of the video guide shows the step that was not matched by a user activity in resolving the same operating error.

FIG. 8 is a flowchart representing the operation to be performed by the MFP 1 when the MFP 1 detects an operating error, in the case of FIGS. 7A to 7C where any of the key frames shows the step that was not matched by a user activity in resolving the same operating error.

In Step S21, the MFP 1 stores default key frames in advance on the memory 15 about every operating error; each of them has been selected by default from multiple key frames of a video guide on how to recover from an operating error.

In Step S22, the MFP 1 detects the occurrence of an operating error. In Step S23, the MFP 1 judges whether or not any of the key frames is stored because the user made a mistake in the corresponding step, i.e., whether or not any of the key frames shows the step that was not matched by a user activity in resolving the same operating error.

If any of them is stored (YES in Step S23), the flowchart proceeds to Step S24, in which the MFP 1 replaces the key frame stored in Step S21 with the key frame stored because the user made a mistake in the corresponding step. The flowchart then proceeds to Step S25. If none of them is stored because the user made a mistake in the corresponding step (NO in Step S23), the flowchart proceeds directly to Step S25.

In Step S25, the MFP 1 displays either the default key frame or the lately replaced key frame as a still frame for a digest, in a display screen with a notice of the occurrence of the operating error.

In Step S26, the MFP 1 then judges whether or not the guide start key 171*a* shown in the screen is pressed. If it is pressed (YES in Step S26), the MFP 1 starts the video guide in Step S27. If it is not pressed (NO in Step S26), the MFP 1 does not start the video guide.

Figure 9:
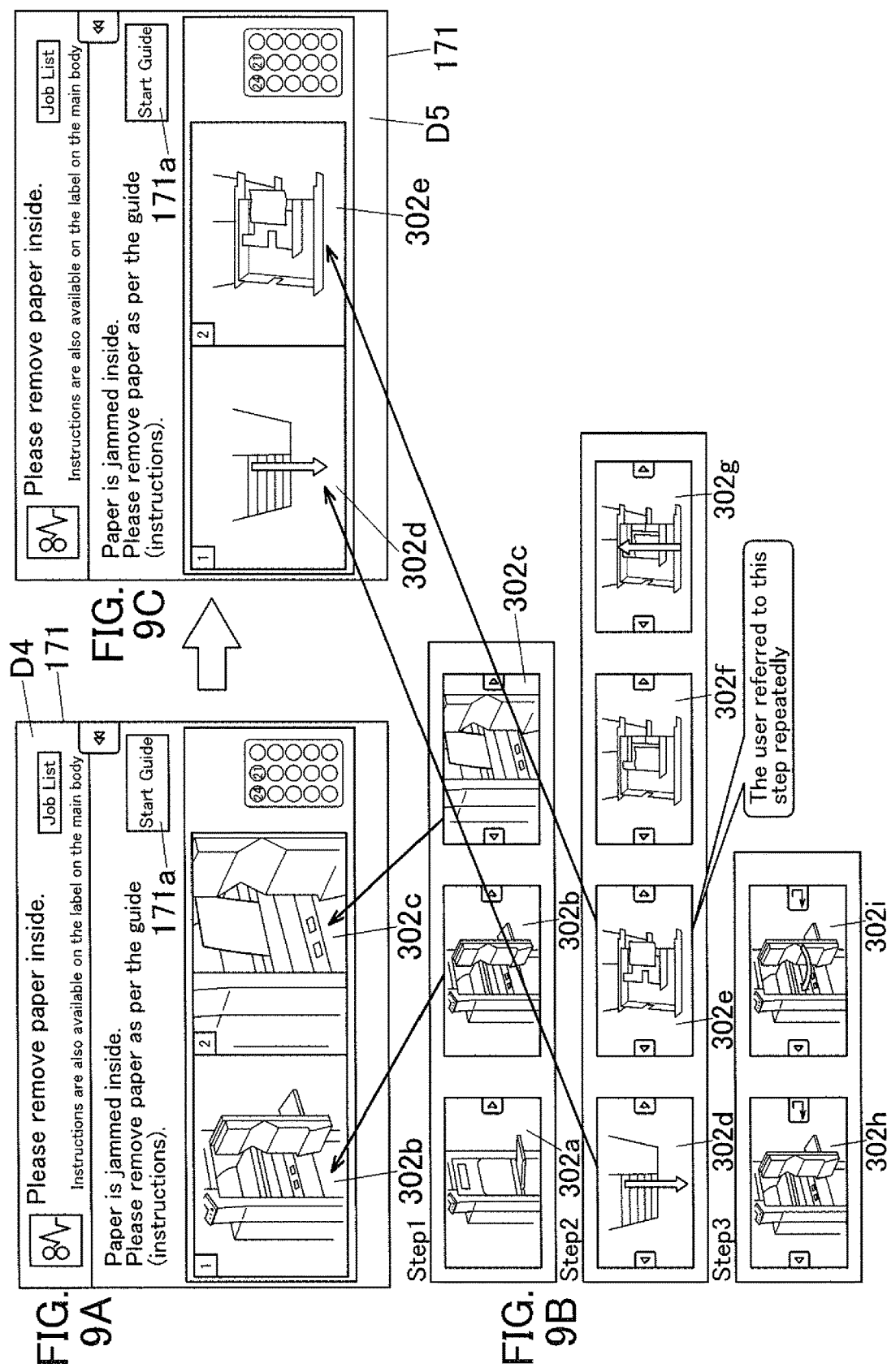
FIGS. 9A, 9B, and 9C are views for reference in describing another example of "a key frame stored with a specific condition" in Step S03 of the FIG. 5 flowchart.

FIGS. 9A to 9C are views for reference in describing another example of "a key frame stored with a specific condition" in Step S03 of the FIG. 5 flowchart. In this embodiment, the MFP 1 is configured to store in advance a key frame having ever been displayed by the user repeatedly for more than a certain period of time, on a recording medium such as the display 15; it is any of the key frames of a video guide on how to recover from an operating error.

At a later time, upon detecting the same operating error, the MFP 1 displays key frames, including the key frame having ever been displayed repeatedly for more than a certain period of tome, as still frames for a digest, on the display 171.

Hereinafter, a specific example will be described. Upon detecting an operating error, the MFP 1 displays a display screen D4 as illustrated in FIG. 9A; the display screen D4 shows the key frames 302*b* and 302*c* by default, out of the key frames 302*a* to 302*i* of the video guide as illustrated in FIG. 9B, as still frames for a digest. The MFP 1 counts and measures the number of times and the total period of time the key frames 302*a* to 302*i* of the video guide each has ever been displayed by the user. If the key frame 302*e*, for example, has ever been displayed by the user repeatedly for more than a certain period of time, the MFP 1 stores the key frame 302*e* about the operating error.

At a later time, upon detecting the same operating error, the MFP 1 displays a screen D5 as illustrated in FIG. 9C; the screen D5 shows the key frame 302*e* that has ever been displayed by the user repeatedly for more than a certain period of time and the key frame 301*d* that shows the step right before the step shown in the key frame 302*e*, as still frames for a digest, in place of the key frames 302*b* and 302*c* that are selected by default.

As described above, in this embodiment, if the key frame 302*e*, out of the key frames 302*a* to 302*i*, has ever been displayed by the user repeatedly for more than a certain period of time, the MFP 1 displays key frames, including the key frame 302*e*, as still frames for a digest. With this key frame, the user can learn the activity for the step to which the user previously referred repeatedly and can resolve the operating error without any problem.

Figure 10:
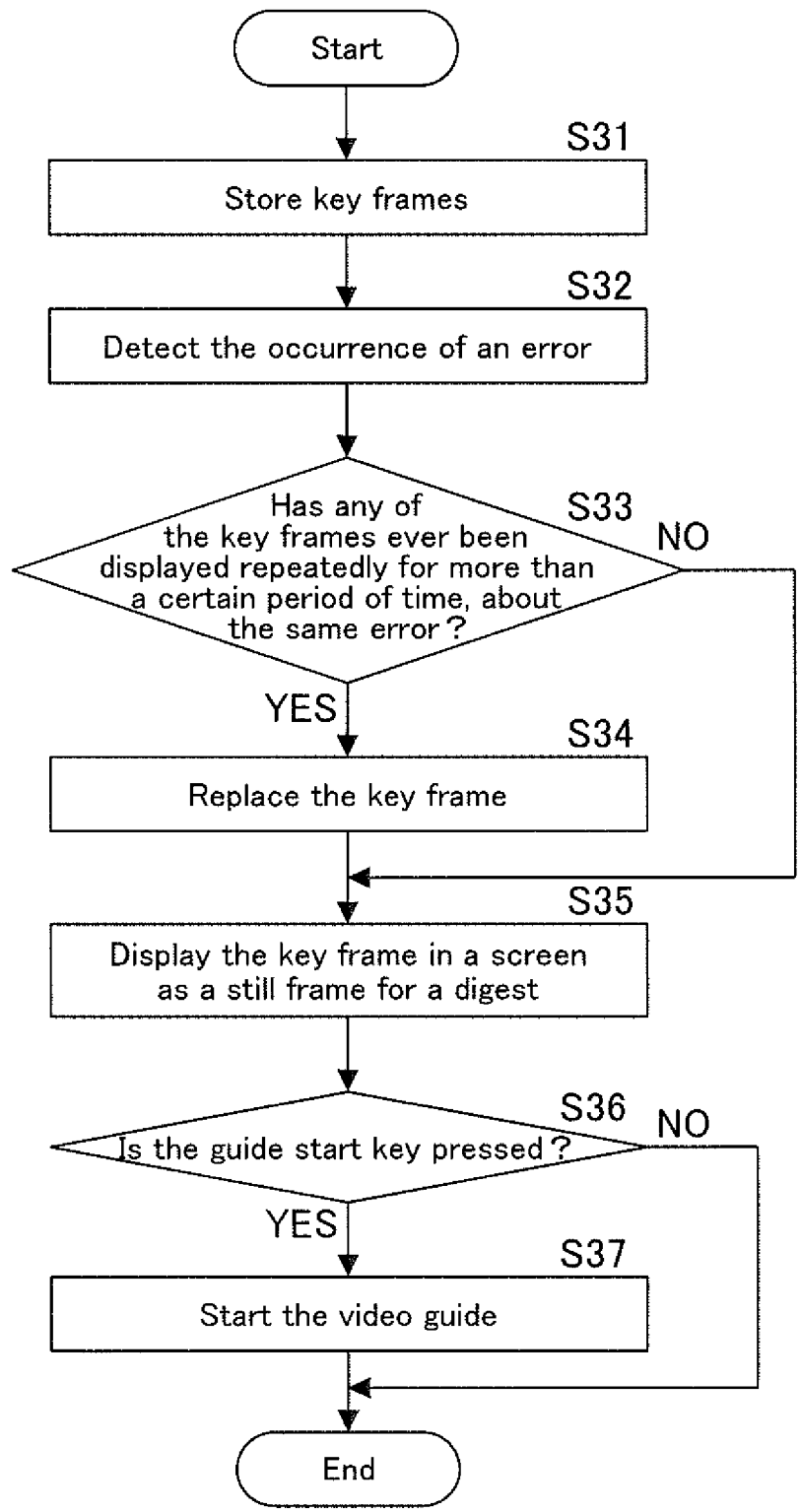
FIG. 10 is a flowchart representing the operation to be performed by the image processing apparatus when the image processing apparatus detects an operating error, in the case of FIG. 9 where any of the key frames of the video guide has ever been displayed by the user repeatedly for more than a certain period of time.

FIG. 10 is a flowchart representing the operation to be performed by the MFP 1 when the MFP 1 detects an operating error, in the case of FIGS. 9A to 9C where any of the key frames of the video guide has ever been displayed by the user repeatedly for more than a certain period of time;

In Step S31, the MFP 1 stores default key frames in advance on the memory 15 about every operating error; each of them has been selected by default from multiple key frames of a video guide on how to recover from an operating error.

In Step S32, the MFP 1 detects the occurrence of an operating error. In Step S33, the MFP 1 judges whether or not any of the key frames stored thereon has ever been displayed by the user repeatedly for more than a certain period of time, about the same operating error.

If any of them has been displayed (YES in Step S33), the flowchart proceeds to Step S34, in which the MFP 1 replaces the key frame stored in Step S31 with the key frame having been displayed repeatedly for more than a certain period of time. The flowchart then proceeds to Step S35. If none of them has been displayed by the user repeatedly for more than a certain period of time (NO in Step S33), the flowchart proceeds directly to Step S35.

In Step S35, the MFP 1 displays either the default key frame or the lately replaced key frame as a still frame for a digest, in a display screen with a notice of the occurrence of the operating error.

In Step S36, the MFP 1 then judges whether or not the guide start key 171*a* shown in the screen is pressed. If it is pressed (YES in Step S36), the MFP 1 starts the video guide in Step S37. If it is not pressed (NO in Step S36), the MFP 1 does not start the video guide.

Figure 11:
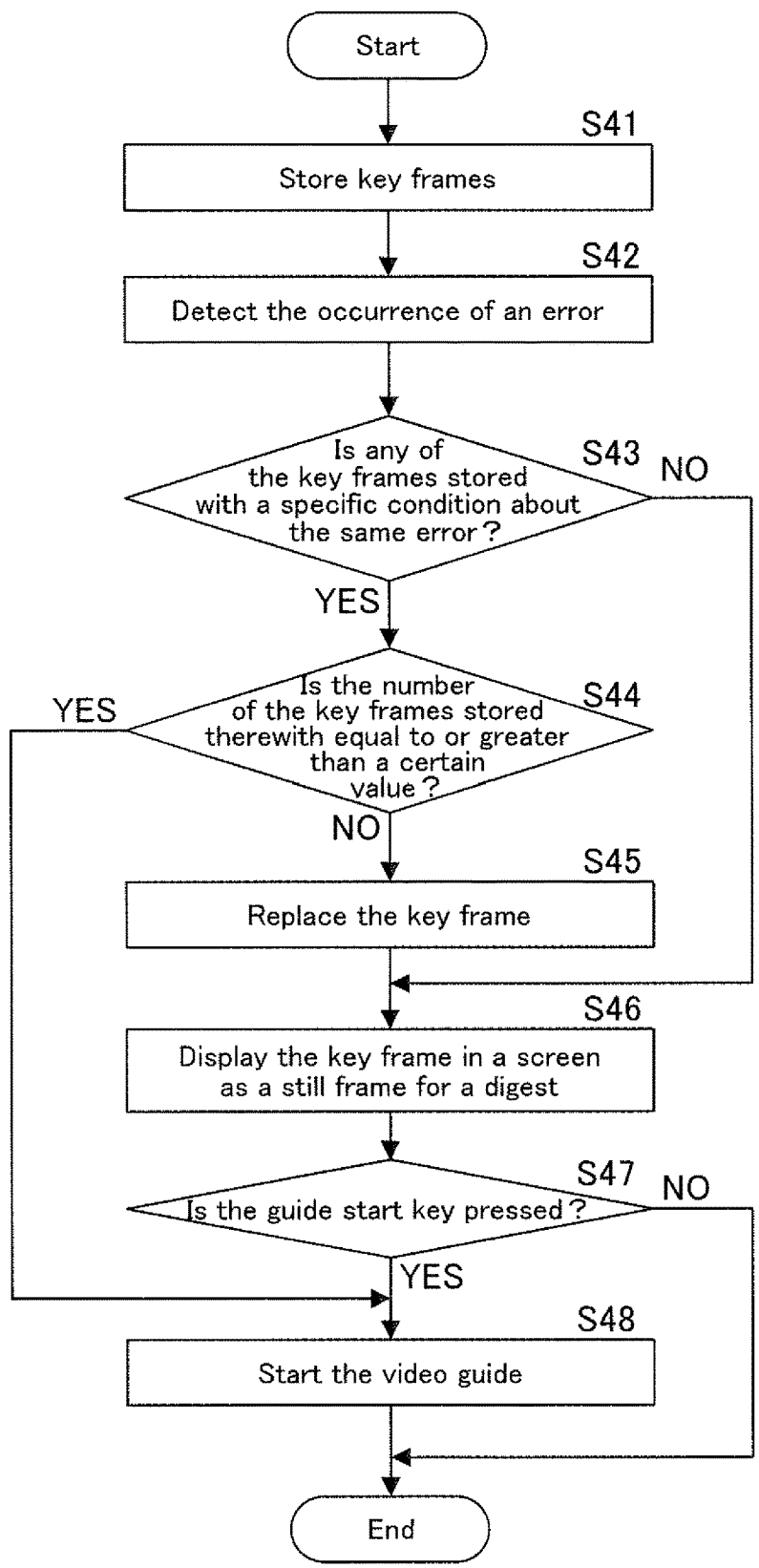
FIG. 11 is a flowchart representing yet another processing to be executed by the image processing apparatus when the image processing apparatus detects an operating error.

FIG. 11 is a flowchart representing yet another processing to be executed by the MFP 1 when the MFP 1 detects an operating error. In this embodiment, the MFP 1 is configured to play back the video guide instead of displaying still images for a digest if the number of the still frames for a digest is greater than a certain value. That is because it is undesirable that the number of the still images for a digest is close to the number of the key frames of the video guide.

In Step S41 of FIG. 11, the MFP 1 stores default key frames in advance on the memory 15 about every operating error; each of them has been selected by default from multiple key frames of a video guide on how to recover from an operating error.

In Step S42, the MFP 1 detects the occurrence of an operating error. In Step S43, the MFP 1 judges whether or not any of the key frames is stored with a specific condition about the same operating error.

If any of them is stored with a specific condition (YES in Step S43), the MFP 1 then judges in Step S44 whether or not the number of the key frames stored with a specific condition is equal to or greater than a certain value. If it is equal to or greater than a certain value (YES in Step S44), the MFP 1 starts the video guide in Step S48. If it is not equal to or greater than a certain value (NO in Step S44), the flowchart proceeds to Step S45, in which the MFP 1 replaces the key frame stored in Step S41 with the key frame stored with the specific condition. The flowchart then proceeds to Step S46. Back to Step S43, if none of the key frames is stored with a specific condition (NO in Step S43), the flowchart proceeds directly to Step S46.

In Step S46, the MFP 1 displays either the default key frame or the lately replaced key frame as a still frame for a digest, in a display screen with a notice of the occurrence of the operating error.

In Step S47, the MFP 1 then judges whether or not the guide start key 171a shown in the screen is pressed. If it is pressed (YES in Step S47), the MFP 1 starts the video guide in Step S48. If it is not pressed (NO in Step S47), the MFP 1 does not start the video guide.

The FIG. 11 flowchart is also executable similarly in the case where the still frame for a digest is the user's selected key frame. In other words, the MFP 1 may be configured to start playback of the video guide instead of displaying the user's selected key frames as still frames for a digest, if the number of the user's selected key frames is equal to or greater than a certain value.

Figure 12:
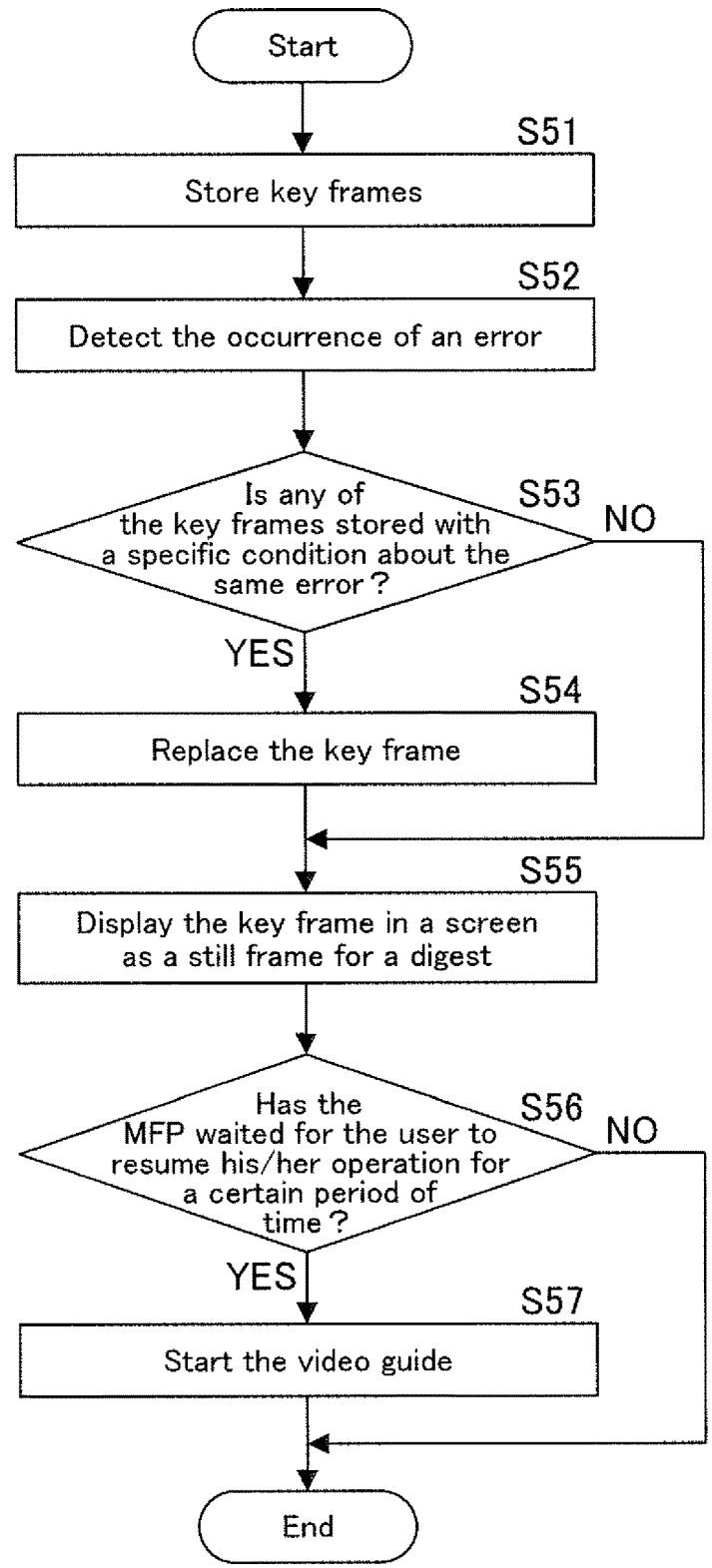
FIG. 12 is a flowchart representing still yet another processing to be executed by the image processing apparatus when the image processing apparatus detects an operating error.

FIG. 12 is a flowchart representing still yet another processing to be executed by the MFP 1 when the MFP 1 detects an operating error. In this embodiment, the MFP 1 is configured to automatically start playback of the video guide if the MFP 1 has waited for the user to resume his/her operation for a certain period of time while displaying a still frame for a digest.

In Step S51 of FIG. 12, the MFP 1 stores default key frames in advance on the memory 15 about every operating error; each of them has been selected by default from multiple key frames of a video guide on how to recover from an operating error.

In Step S52, the MFP 1 detects the occurrence of an operating error. In Step S53, the MFP 1 judges whether or not any of the key frames is stored with a specific condition about the same operating error.

If any of them is stored with a specific condition (YES in Step S53), the flowchart proceeds to Step S54, in which the MFP 1 replaces the key frame stored in Step S51 with the key frame stored with the specific condition. The flowchart then proceeds to Step S55. Back to Step S53, if none of the key frames is stored with a specific condition (NO in Step S53), the flowchart proceeds directly to Step S55.

In Step S55, the MFP 1 displays either the default key frame or the lately replaced key frame as a still frame for a digest, in a display screen with a notice of the occurrence of the operating error.

In Step S56, the MFP 1 then judges whether or not the apparatus (MFP 1) has waited for the user to resume his/her operation for a certain period of time. If the MFP 1 has waited for a certain period of time (YES in Step S56), the MFP 1 starts the video guide in Step S57. If the user resumes his/her operation before the lapse of a certain period of time (NO in Step S56), the MFP 1 does not start the video guide.

As described above, if the MFP 1 has waited for the user to resume his/her operation for a certain period of time while displaying a still frame for a digest, the MFP 1 automatically starts playback of the video guide because it is likely that the user had a difficulty in completing resolving the operating error only by referring to the still frame for a digest. With this video guide, the user can learn how to resolve the operating error without any problem.

The FIG. 12 flowchart is also executable similarly in the case where the still frame for a digest is the user's selected key frame. In other words, the MFP 1 may be configured to start playback of the video guide if the MFP 1 has waited for the user to resume his/her operation for a certain period of time while displaying the user's selected key frame as a still frame for a digest.

Figure 13:
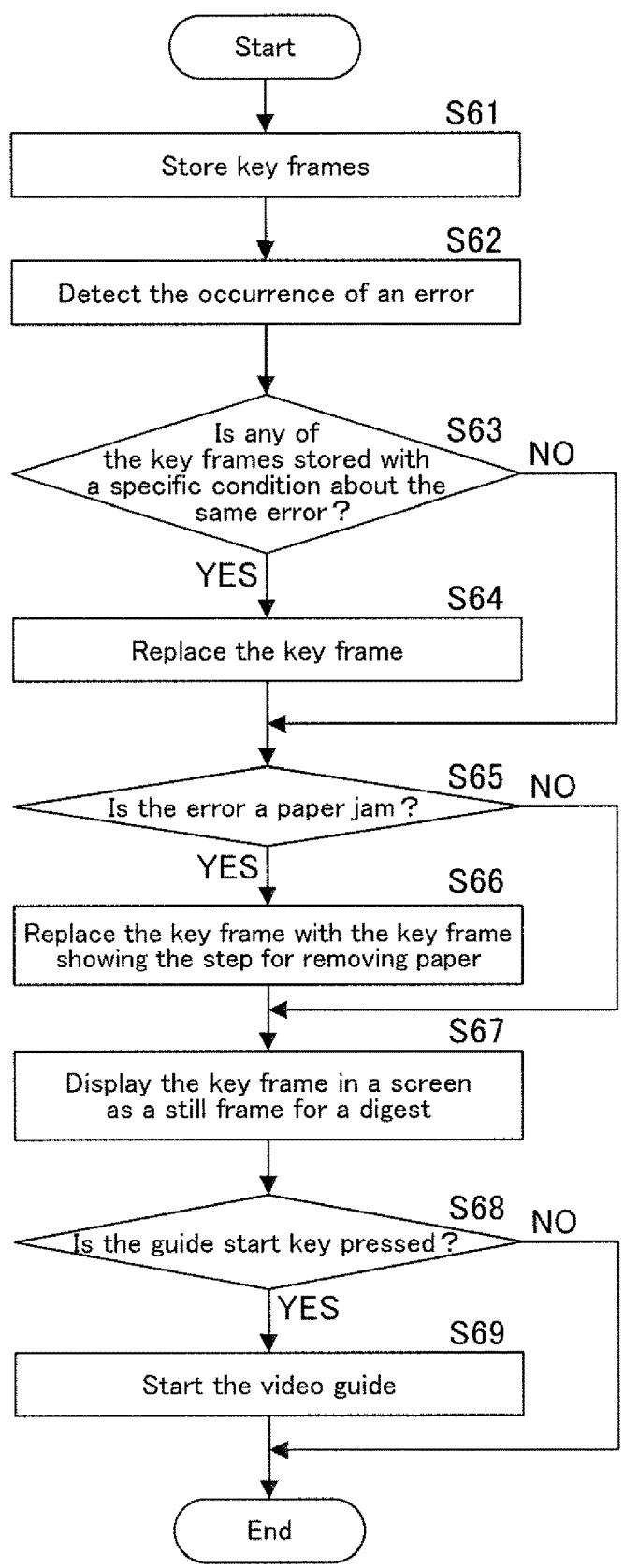
FIG. 13 is a flowchart representing further still yet another processing to be executed by the image processing apparatus when the image processing apparatus detects an operating error.

FIG. 13 is a flowchart representing further still yet another processing to be executed by the MFP 1 when the MFP 1 detects an operating error. In this embodiment, the MFP 1 is configured to display a predetermined key frame as a still frame for a digest upon detecting an operating error specified in advance. An example of the operating error specified in advance is a paper jam; an example of the predetermined key frame is a key frame that shows the step for removing jammed paper.

In Step S61 of FIG. 13, the MFP 1 stores default key frames in advance on the memory 15 about every operating error; each of them has been selected by default from multiple key frames of a video guide on how to recover from an operating error.

In Step S62, the MFP 1 detects the occurrence of an operating error. In Step S63, the MFP 1 judges whether or not any of the key frames is stored with a specific condition about the same operating error.

If any of them is stored with a specific condition (YES in Step S63), the flowchart proceeds to Step S64, in which the MFP 1 replaces the key frame stored in Step S61 with the key frame stored with the specific condition. The flowchart then proceeds to Step S65. Back to Step S63, if none of the key frames is stored with a specific condition (NO in Step S63), the flowchart proceeds directly to Step S65.

In Step S65, the MFP 1 judges whether or not the operating error is a paper jam. If it is a paper jam (YES in Step S65), the flowchart proceeds to Step S66, in which the MFP 1 replaces either the default key frame or the key frame stored with the specific condition, with the key frame that shows the step for removing jammed paper. The flowchart then proceeds to Step S67. Back to Step S65, if it is not a paper jam (NO in Step S65), the flowchart proceeds directly to Step S67.

In Step S67, the MFP 1 displays the key frame as a still frame for a digest, in a display screen with a notice of the occurrence of the operating error. Specifically, after the judgment that the operating error is a paper jam, the MFP 1 displays the key frame that shows the step for removing jammed paper.

In Step S68, the MFP 1 then judges whether or not the guide start key 171a shown in the screen is pressed. If it is pressed (YES in Step S68), the MFP 1 starts the video guide in Step S69. If it is not pressed (NO in Step S68), the MFP 1 does not start the video guide.

As described above, upon detecting an operating error specified in advance e.g. a paper jam, the MFP 1 displays a predetermined key frame e.g. a key frame showing the step for removing jammed paper, in place of a key frame stored with a specific condition, as a still frame for a digest. So, the user can see the most suitable key frame for an operating error specified in advance.

The FIG. 13 flowchart is also executable similarly in the case where the still frame for a digest is the user's selected key frame. Specifically, the MFP 1 may be configured to display a predetermined key frame in place of the user's selected key frame as a still frame for a digest upon detecting an operating error specified in advance.

Figure 14:
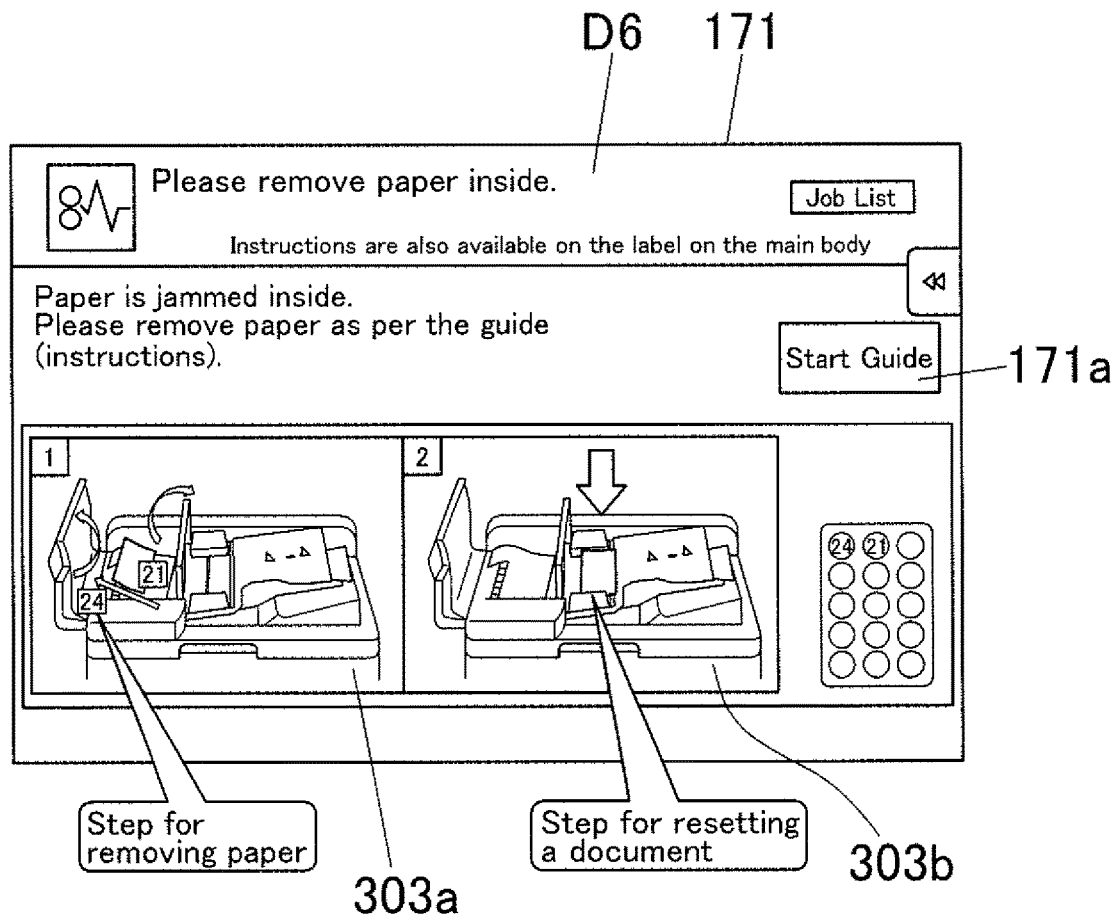
FIG. 14 illustrates a screen to be displayed on the display of the image processing apparatus when the image processing apparatus detects a paper jam on the document conveying device which is an operating error specified in advance.

FIG. 14 illustrates a screen D6 to be displayed on the display 171 of the MFP 1 when the MFP 1 detects a paper jam on the document conveying device (ADF) 50 which is an operating error specified in advance. In this example, the MFP 1 is configured to always display the key frame 303a that shows the step for removing jammed paper and the key frame 303b that shows the step for resetting a document, as still frames for a digest, upon detecting a paper jam on the document conveying device (ADF) 50. So, the MFP 1 can display the most suitable key frames for a paper jam on the document conveying device (ADF) 50.

Figure 15:
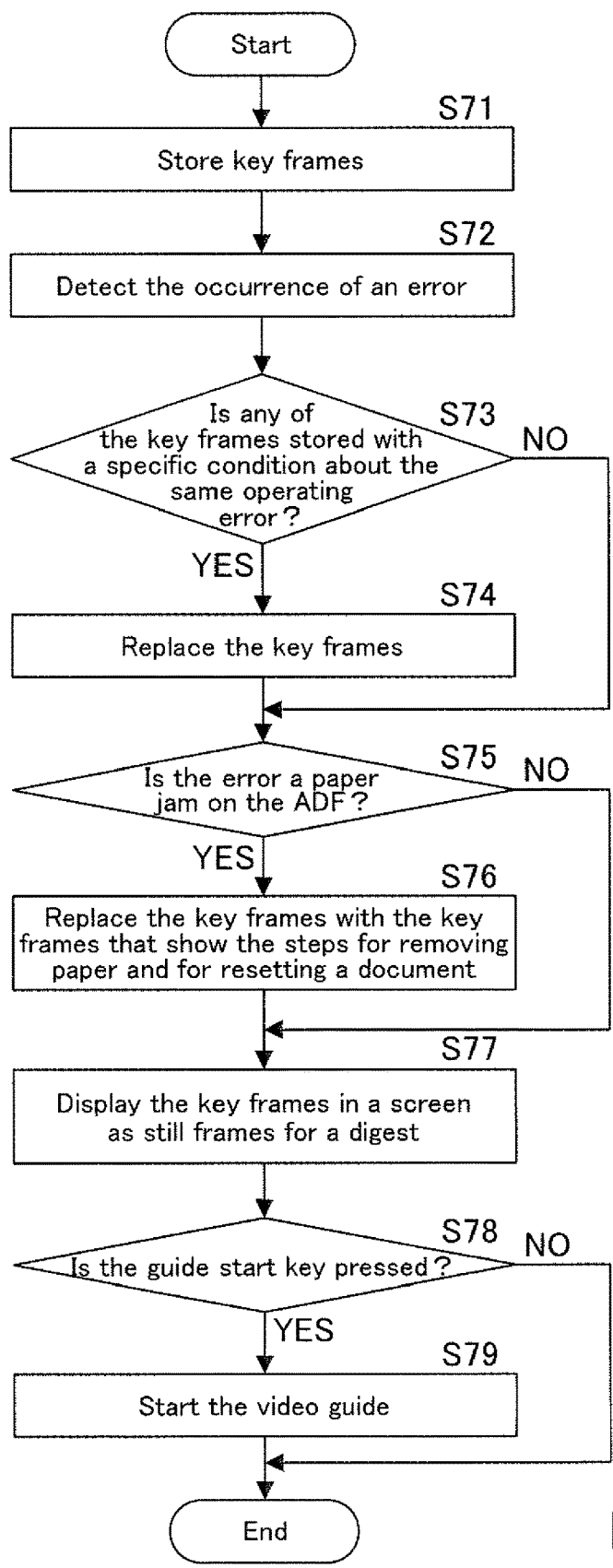
FIG. 15 is a flowchart representing a processing to be executed by the image processing apparatus when the image processing apparatus detects a paper jam on the document conveying device which is an operating error specified in advance.

FIG. 15 is a flowchart representing a processing to be performed by the MFP 1 when the MFP 1 detects a paper jam on the document conveying device (ADF) 50 which is an operating error specified in advance.

In Step S71, the MFP 1 stores default key frames in advance on the memory 15 about every operating error; each of them has been selected by default from multiple key frames of a video guide on how to recover from an operating error.

In Step S72, the MFP 1 detects the occurrence of an operating error. In Step S73, the MFP 1 judges whether or not any of the key frames is stored with a specific condition about the same operating error.

If any of them is stored with a specific condition (YES in Step S73), the flowchart proceeds to Step S74, in which the MFP 1 replaces the key frames stored in Step S71 with the key frames stored with the specific condition. The flowchart then proceeds to Step S75. Back to Step S73, if none of the key frames is stored with a specific condition (NO in Step S73), the flowchart proceeds directly to Step S75.

In Step S75, the MFP 1 judges whether or not the operating error is a paper jam on the document conveying device (ADF) 50. If it is a paper jam (YES in Step S75), the flowchart proceeds to Step S76, in which the MFP 1 replaces either the default key frames or the key frames stored with the specific condition, with the key frames 303a that shows the step for removing jammed paper and the key frame 303b that shows the step for resetting a document. The flowchart then proceeds to Step S77. Back to Step S75, if it is not a paper jam on the document conveying device 50 (NO in Step S75), the flowchart proceeds directly to Step S77.

In Step S77, the MFP 1 displays the key frames as still framed for a digest, in a display screen with a notice of the occurrence of the operating error. Specifically, after the judgment that the operating error is a paper jam on the document conveying device (ADF) 50, the MFP 1 displays the key frame 303a that shows the step for removing jammed paper and the key frame 303b that shows the step for resetting a document.

In Step S78, the MFP 1 then judges whether or not the guide start key 171a shown in the screen is pressed. If it is pressed (YES in Step S78), the MFP 1 starts the video guide in Step S79. If it is not pressed (NO in Step S78), the MFP 1 does not start the video guide.

The FIG. 15 flowchart is also executable similarly in the case where the still frames for a digest are the user's selected key frames. Specifically, the MFP 1 may be configured to display the key frame 303a that shows the step for removing jammed paper and the key frame 303b that shows the step for resetting a document, in place of the user's selected key frames, as still frames for a digest, upon detecting a paper jam on the document conveying device 50 which is an operating error specified in advance.

Figure 16:
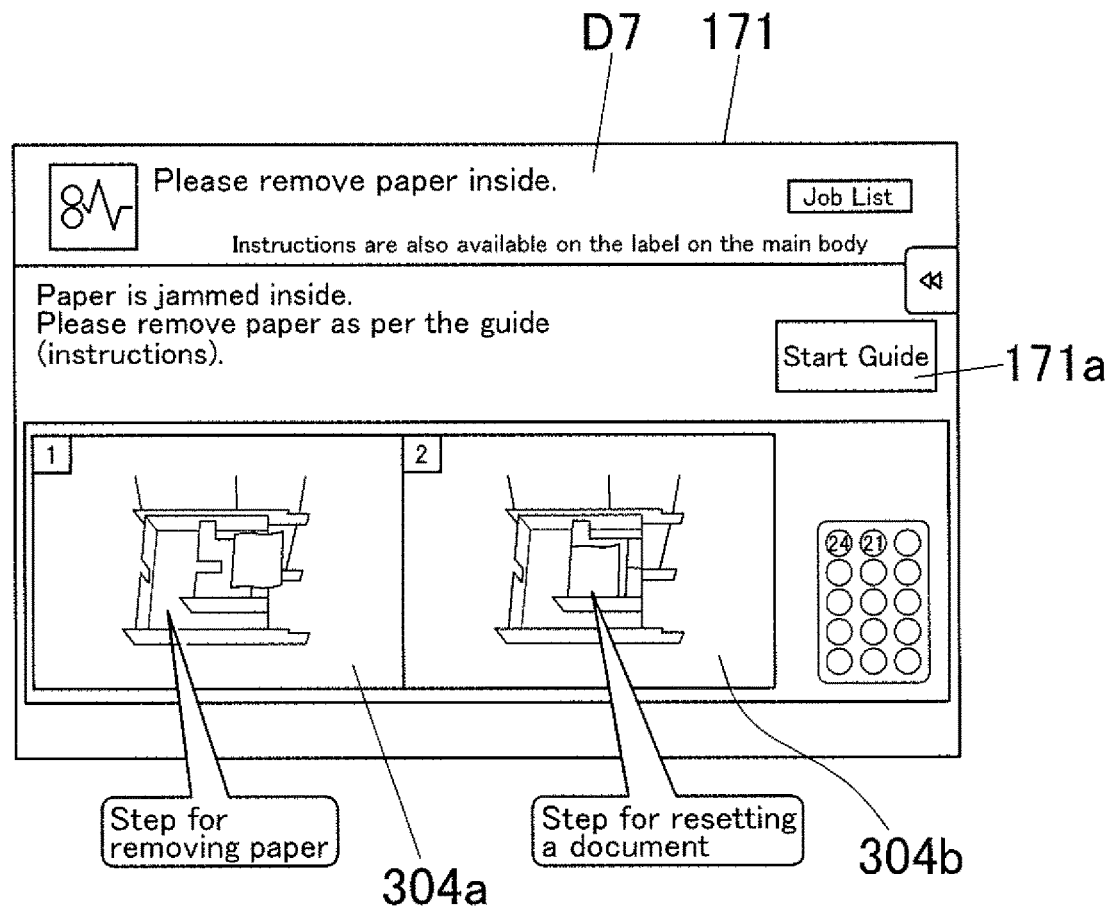
FIG. 16 illustrates a screen to be displayed on the display of the image processing apparatus when the image processing apparatus detects a paper jam on the paper feed tray which is an operating error specified in advance.

FIG. 16 illustrates a screen D7 to be displayed on the display 171 of the MFP 1 when the MFP 1 detects a paper jam on the paper feed tray (paper cassette tray) 70 which is an operating error specified in advance. In this example, the MFP 1 is configured to always display the key frame 304a that shows the step for removing jammed paper and the key frame 304b that shows the step for resetting paper, as still frames for a digest, upon detecting a paper jam on the paper feed tray 70. So, the MFP 1 can display the most suitable key frames for a paper jam on the paper feed tray 70.

Figure 17:
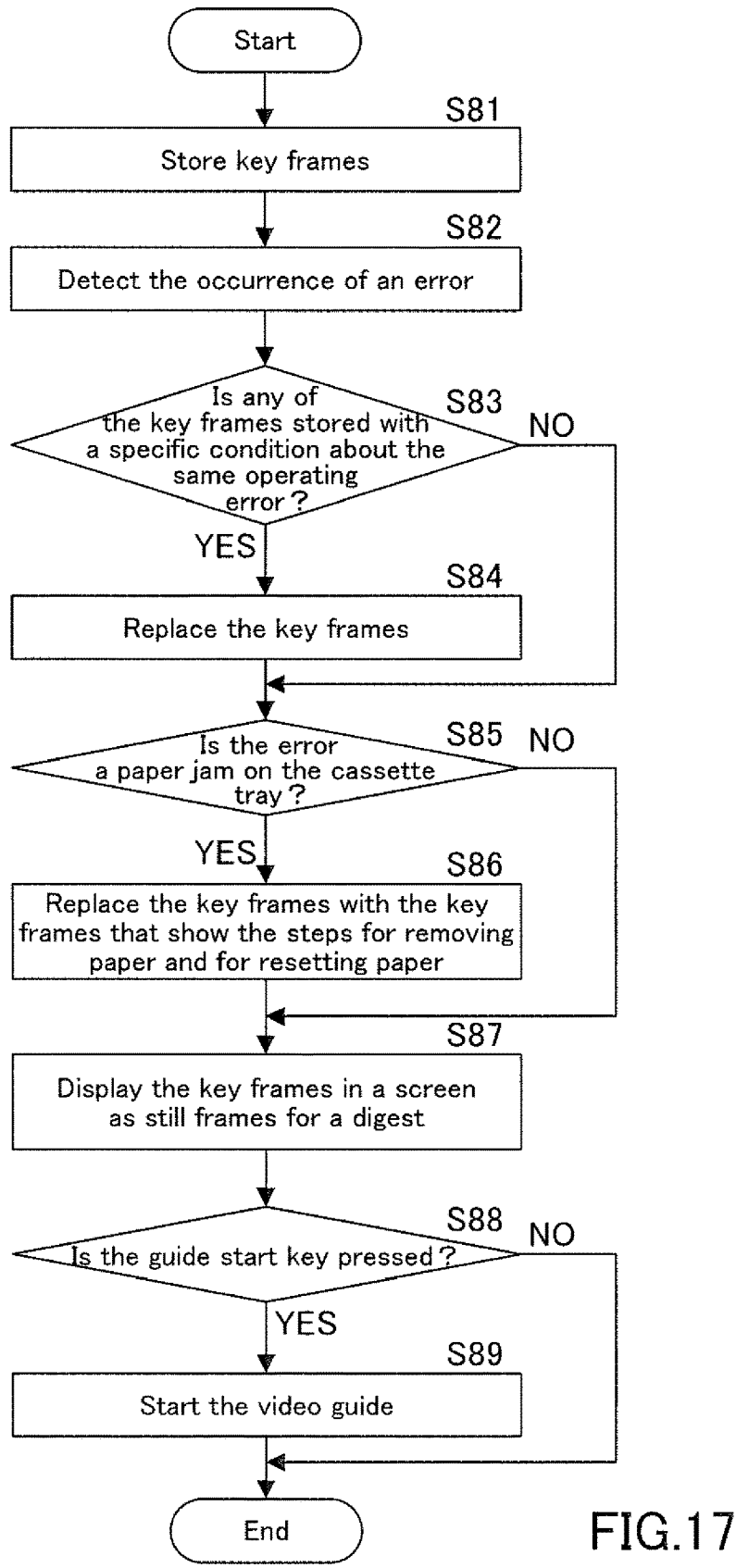
FIG. 17 is a flowchart representing a processing to be executed by the image processing apparatus when the image processing apparatus detects a paper jam on the paper feed tray which is an operating error specified in advance.

FIG. 17 is a flowchart representing a processing to be executed by the MFP 1 when the MFP 1 detects a paper jam on the paper feed tray 70 which is an operating error specified in advance.

In Step S81, the MFP 1 stores default key frames in advance on the memory 15 about every operating error; each of them has been selected by default from multiple key frames of a video guide on how to recover from an operating error.

In Step S82, the MFP 1 detects the occurrence of an operating error. In Step S83, the MFP 1 judges whether or not any of the key frames is stored with a specific condition about the same operating error.

If any of them is stored with a specific condition (YES in Step S83), the flowchart proceeds to Step S84, in which the MFP 1 replaces the key frames stored in Step S81 with the key frames stored with the specific condition. The flowchart then proceeds to Step S85. Back to Step S83, if none of the key frames is stored with a specific condition (NO in Step S83), the flowchart proceeds directly to Step S85.

In Step S85, the MFP 1 judges whether or not the operating error is a paper jam on the paper feed tray 70. If it is a paper jam (YES in Step S85), the flowchart proceeds to Step S86, in which the MFP 1 replaces either the default key frames or the key frames stored with the specific condition, with the key frames 304a that shows the step for removing jammed paper and the key frame 304b that shows the step for resetting paper. The flowchart then proceeds to Step S87. Back to Step S85, if it is not a paper jam on the paper feed tray 70 (NO in Step S85), the flowchart proceeds directly to Step S87.

In Step S87, the MFP 1 displays the key frames as still frames for a digest, in a display screen with a notice of the occurrence of the operating error. Specifically, after the judgment that the operating error is a paper jam on the paper feed tray 70, the MFP 1 displays the key frame 304a that shows the step for removing jammed paper and the key frame 304b that shows the step for resetting paper.

In Step S88, the MFP 1 then judges whether or not the guide start key 171a shown in the screen is pressed. If it is pressed (YES in Step S88), the MFP 1 starts the video guide in Step S89. If it is not pressed (NO in Step S89), the MFP 1 does not start the video guide.

The FIG. 17 flowchart is also executable similarly in the case where the still frames for a digest are the user's selected key frames. Specifically, the MFP 1 may be configured to display the key frame 304*a* that shows the step for removing jammed paper and the key frame 304*b* that shows the step for resetting paper, in place of the user's selected key frames, as still frames for a digest, upon detecting a paper jam on the paper feed tray 70 which is an operating error specified in advance.

Although embodiments of the present invention have been described and illustrated in detail, it is clearly understood that the same is by way of illustration and example only and not limitation, the scope of the present invention should be interpreted by terms of the appended claims.

What is claimed is:

1. An image processing apparatus comprising:
    a display;
    a memory that stores multiple key frames of a video guide on how to recover from an operating error and further stores at least one of the multiple key frames as a still frame for a digest on how to recover from the operating error;
    an updater that updates the still frame for the digest by storing at least one of the multiple key frames to the memory based on user interactions during recovery from previous operating errors causing at least one of the multiple key frames to have been displayed repeatedly for more than a certain period of time;
    an error sensor that detects the operating error; and
    a display processor that allows the display to display at least one of the multiple key frames as the still frame for the digest along with an operation button for video playback, when the error sensor detects the operating error, the multiple key frames being stored on the memory, and that further allows the display to play back the video guide by serially displaying the multiple key frames, when the operation button is pressed.

2. The image processing apparatus according to claim 1, wherein each of the multiple key frames is associated with a step of instructions on how to recover from the operating error, the image processing apparatus further comprising a judgment portion that judges whether or not the steps shown in the multiple key frames of the video guide are matched by user activities in resolving the operating error, wherein the at least one key frame is or includes a key frame showing the step not being matched by a user activity.

3. The image processing apparatus according to claim 1, wherein the at least one key frame is or includes a key frame having been displayed by a user repeatedly for more than a certain period of time.

4. The image processing apparatus according to claim 1, wherein, if a number of the at least one key frame is equal to or greater than a certain value, the display processor allows the display to play back the video guide by serially displaying the multiple key frames, instead of displaying the at least one key frame as a still frame for a digest.

5. The image processing apparatus according to claim 1, wherein, if a user has not resumed his/her operation for more than a certain period of time while the at least one key frame is displayed, the display processor allows the display to start playback of the video guide by serially displaying the multiple key frames.

6. The image processing apparatus according to claim 1, wherein, if the operating error detected by the error sensor is an operating error specified in advance, the display controller allows the display to display a predetermined key frame as a still frame for a digest.

7. The image processing apparatus according to claim 6, wherein the operating error specified in advance is a paper jam and the predetermined key frame shows the step for removing jammed paper.

8. The image processing apparatus according to claim 6, wherein the operating error specified in advance is a paper jam on a document conveying device and the predetermined key frames show a step for removing jammed paper and the step for resetting a document.

9. The image processing apparatus according to claim 6, wherein the operating error specified in advance is a paper jam on a paper feed tray for loading printing paper and the predetermined key frames show a step for removing jammed paper and the step for resetting paper.

10. An error recovery image display method to be implemented by an image processing apparatus, the error recovery image display method comprising:
    detecting an operating error;
    the image processing apparatus comprising: a display; a memory that stores multiple key frames of a video guide on how to recover from an operating error, and further stores at least one of the multiple key frames as a still frame for a digest on how to recover from the operating error; and an updater that updates the still frame for the digest by storing at least one of the multiple key frames to the memory based on user interactions during recovery from previous operating errors, causing at least one of the multiple key frames to have been displayed repeatedly for more than a certain period of time,
    allowing the display to display at least one of the multiple key frames as a still frame for a digest along with an operation button for video playback, when the operating error is detected, the multiple key frames being stored on the memory, and further allowing the display to play back the video guide by serially displaying the multiple key frames, when the operation button is pressed.

11. A non-transitory computer-readable recording medium storing a program for displaying an error recovery image, the program to be run by a computer to make the computer execute:
    detecting an operating error;
    an image processing apparatus comprising: a display; a memory that stores multiple key frames of a video guide on how to recover from an operating error, and further stores at least one of the multiple key frames as a still frame for a digest on how to recover from the operating error; and an updater that updates the still frame for the digest by storing at least one of the multiple key frames to the memory based on user interactions during recovery from previous operating errors, causing at least one of the multiple key frames to have been displayed repeatedly for more than a certain period of time,
    allowing the display to display at least one of the multiple key frames as a still frame for a digest along with an operation button for video playback, when the operating error is detected, the multiple key frames being stored on the memory, and further allowing the display to play back the video guide by serially displaying the multiple key frames, when the operation button is pressed.

12. The non-transitory computer-readable recording medium according to claim 11, storing the program to be run by the computer, wherein each of the multiple key frames is associated with a step of instructions on how to recover from the operating error and the at least one key frame is a key frame selected in advance by a user.

13. The non-transitory computer-readable recording medium according to claim 11, storing the program to be run by the computer, wherein each of the multiple key frames is associated with a step of instructions on how to recover from the operating error, the non-transitory computer-readable recording medium storing the program to further make the computer execute judging whether or not the steps shown in the multiple key frames of the video guide are matched by user activities in resolving the operating error, wherein the at least one key frame is or includes a key frame showing the step not being matched by a user activity.

14. The non-transitory computer-readable recording medium according to claim 11, storing the program to be run by the computer, wherein the at least one key frame is or includes a key frame having ever been displayed by the user repeatedly for more than a certain period of time.

15. The non-transitory computer-readable recording medium according to claim 11, storing the program to be run by the computer, wherein, if a number of the at least one key frame is equal to or greater than a certain value, the display is allowed to play back the video guide by serially displaying the multiple key frames, instead of displaying the at least one key frame as a still frame for a digest.

16. The non-transitory computer-readable recording medium according to claim 11, storing the program to be run by the computer, wherein, if a user has not resumed his/her operation for more than a certain period of time while the at least one key frame is displayed, the display is allowed to start playback of the video guide by serially displaying the multiple key frames.

17. The non-transitory computer-readable recording medium according to claim 11, storing the program to be run by the computer, wherein, if the operating error detected is an operating error specified in advance, the display is allowed to display a predetermined key frame as a still frame for a digest.

18. The non-transitory computer-readable recording medium according to claim 17, storing the program to be run by the computer, wherein the operating error specified in advance is a paper jam and the predetermined key frame shows the step for removing jammed paper.

19. The non-transitory computer-readable recording medium according to claim 17, storing the program to be run by the computer, wherein the operating error specified in advance is a paper jam on a document conveying device and the predetermined key frames show steps for removing jammed paper and for resetting a document.

20. The non-transitory computer-readable recording medium according to claim 17, storing the program to be run by the computer, wherein the operating error specified in advance is a paper jam on a paper feed tray for loading printing paper and the predetermined key frames show steps for removing jammed paper and for resetting paper.

21. An image processing apparatus comprising:
a display;
a memory that stores multiple key frames of a video guide on how to recover from an operating error and further stores at least one of the multiple key frames as a still frame for a digest on how to recover from the operating error;
an updater that updates the still frame by storing at least one of the multiple key frames to the memory based on user interactions during recovery from previous operating errors causing at least one of the multiple key frames to have been displayed repeatedly for more than a certain period of time;
a controller that stores at least one of the multiple key frames on the memory as the still frame for the digest, the at least one key frame being selected by a user;
an error sensor that detects the operating error; and
a display processor that allows the display to display at least one of the multiple key frames as the still frame for the digest along with an operation button for video playback, when the error sensor detects the operating error, the multiple key frames being stored on the memory, and that further allows the display to play back the video guide by serially displaying the multiple key frames, when the operation buttons are pressed.

* * * * *